United States Patent
Fujikawa et al.

(10) Patent No.: US 7,714,883 B2
(45) Date of Patent: May 11, 2010

(54) OPTICAL HEAD, CONTROL METHOD THEREOF, AND IMAGE FORMING APPARATUS

(75) Inventors: Shinsuke Fujikawa, Shino (JP); Hiroaki Jo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 11/873,675

(22) Filed: Oct. 17, 2007

(65) Prior Publication Data
US 2008/0111878 A1    May 15, 2008

(30) Foreign Application Priority Data
Nov. 13, 2006    (JP)    ............... 2006-306253

(51) Int. Cl.
B41J 2/435    (2006.01)
B41J 2/45    (2006.01)
(52) U.S. Cl. .................. 347/238; 347/236; 347/246; 347/247
(58) Field of Classification Search ............... 347/133, 347/233, 236, 237, 238
See application file for complete search history.

(56) References Cited

U.S. PATENT DOCUMENTS

| 4,716,291 | A | * | 12/1987 | Sakamoto et al. | ........... 250/318 |
| 4,967,192 | A | | 10/1990 | Hirane et al. | |
| 5,138,310 | A | | 8/1992 | Hirane et al. | |
| 6,215,513 | B1 | * | 4/2001 | Ashikaga | ........... 347/252 |
| 2001/0048459 | A1 | * | 12/2001 | Sakai et al. | ........... 347/233 |

FOREIGN PATENT DOCUMENTS

| JP | U-60-26854 | 2/1985 |
| JP | A-63-280568 | 11/1988 |
| JP | A-3-227266 | 10/1991 |
| JP | A 06-297769 | 10/1994 |
| JP | A 08-039862 | 2/1996 |
| JP | A-2004-17503 | 1/2004 |
| JP | A-2004-181741 | 7/2004 |
| JP | A 2007-183385 | 7/2007 |
| JP | A 2007-187706 | 7/2007 |
| JP | A 2007-316383 | 12/2007 |

* cited by examiner

Primary Examiner—Matthew Luu
Assistant Examiner—Kendrick X Liu
(74) Attorney, Agent, or Firm—Oliff & Berridge, PLC (57) ABSTRACT

A control method for controlling an optical head having a plurality of light emitting devices, includes: dividing the plurality of light emitting devices into a plurality of blocks by grouping adjacent light emitting devices of the plurality of light emitting devices; adjusting levels of driving signals supplied to the adjacent light emitting devices for each of the plurality of blocks so that emission luminances of the adjacent light emitting devices belonging to the each of the plurality of blocks become substantially equal to each other; and adjusting emission periods so that the equalized emission luminances of the plurality of blocks become substantially equal to each other.

8 Claims, 9 Drawing Sheets

OPTICAL HEAD, CONTROL METHOD THEREOF, AND IMAGE FORMING APPARATUS

BACKGROUND

1. Technical Field

The present invention relates to a technique for correcting luminance of a plurality of light emitting devices.

2. Related Art

An image forming apparatus such as a printer includes an optical head used to form an electrostatic latent image on an image carrier such as a photoconductive drum. The optical head includes a plurality of light emitting devices arranged in the form of an array in a main scan direction. Light emitting diodes may be used as the light emitting devices.

In such an optical head, a plurality of semiconductor chips having light emitting diodes formed thereon, and a separated driving IC are mounted on a print substrate with patterned wire thereon. After manufacture, there exists nonuniformity of light emission luminance between different semiconductor chips or between individual light emitting diodes in the same semiconductor chip. Such nonuniformity of light emission luminance is not preferable for print quality since it may cause unevenness of vertical stripe shapes during printing, for example. Accordingly, driving conditions from the driving IC are finely adjusted depending on characteristics of the light emitting diodes.

As correcting methods used for the optical head in the related art, the following methods are known. JP-A-6-297769 discloses a method of finely adjusting and correcting a period during which light emission current is applied. In addition, JP-A-8-39862 discloses a method of correcting a light emission driving current value using DAC. In the method disclosed in JP-A-8-39862, a plurality of correction memory circuits are provided using micromachining of a semiconductor process and a current value is finely adjusted depending on contents of a memory.

Although the method disclosed in JP-A-6-297769 is based on the principle of adjusting an area of an electrostatic latent image formed on a photoconductor drum by finely adjusting a light emission period, it is necessary to operate a circuit with very high clock frequency to make such fine adjustment of the light emission period. However, it is difficult to apply this method to an optical head integrated with a driving circuit. This is because the driving circuit is formed on a substrate even larger than conventional driving ICs and thus time constant becomes large due to parasitic capacitance, thereby making it impossible to achieve high-speed operation.

In addition, in the method disclosed in JP-A-8-39862, the machining precision of the process of forming a circuit on a large glass substrate is low compared with that of a semiconductor process on a silicon wafer, and thus it is difficult to mount equivalent correction memory circuits on the driving circuit-integrated optical head.

SUMMARY

An advantage of some aspects of the invention is provide an optical head having a wide correction range with a simple structure, a control method thereof, and an image forming apparatus.

According to an aspect of the invention, there is provided a control method for controlling an optical head having a plurality of light emitting devices, including: dividing the plurality of light emitting devices into a plurality of blocks by grouping adjacent light emitting devices of the plurality of light emitting devices; adjusting levels of driving signals supplied to the adjacent light emitting devices for each of the plurality of blocks so that emission luminances of the adjacent light emitting devices belonging to the each of the plurality of blocks become substantially equal to each other; and adjusting emission periods so that the equalized emission luminances of the plurality of blocks become substantially equal to each other.

An optical head having a plurality of light emitting devices has a tendency that nonuniformity of emission luminance of light emitting devices becomes smaller as a distance between light emitting devices becomes smaller and becomes larger as the distance becomes larger. According to the first aspect of the invention, since the adjacent light emitting devices are grouped and divided into a plurality of blocks, intra-block nonuniformity of emission luminance is corrected by adjusting the level of driving signal, and inter-block nonuniformity of emission luminance is corrected by adjusting the emission period, it is possible to correct nonuniformity of emission luminance of the whole of the optical head. In addition, since the correction of the emission luminance is based on two factors, that is, the level of driving signal and the emission period, a range of change of the factors can be narrowed as compared to a case of correction by a single factor.

Preferably, a range of change of emission luminance by adjusting the emission periods is larger than a range of change of emission luminance by adjusting the level of driving signals. As mentioned above, an optical head having a plurality of light emitting devices has a tendency that nonuniformity of emission luminance of light emitting devices becomes smaller as a distance between light emitting devices becomes smaller and becomes larger as the distance becomes larger. Accordingly, it is preferable that a range of change of emission luminance in intra-block correction is small and a range of change of emission luminance in inter-block correction is large.

Preferably, the plurality of light emitting devices are arranged in one direction, and the number of the adjacent light emitting devices belonging to each of the plurality of blocks is the number added with weight on the basis of a relative position relationship of blocks in the optical head. Nonuniformity of luminance of light emitting devices is due to nonuniformity of a manufacture process. Accordingly, there exists nonuniformity depending on a relative position relationship in the plurality of light emitting devices constituting the optical head. According to this aspect of the invention, since the number of the adjacent light emitting devices belonging to each of the plurality of blocks is set depending on the relative position relationship in the optical head, width of correction for each block can become substantially uniform, thereby making it possible to reliably smooth the intra-block emission luminance while smoothing the emission luminance on the whole of the optical head.

That is, in order to make the width of nonuniformity of light emitting devices in each block more uniform compared with a case where the number of light emitting devices belonging to a block is fixed, it is preferable that the number of light emitting devices belonging to the block is the number added with weight based on the relative position relationship of blocks in the optical head.

For example, after manufacture, light emitting devices arranged in one direction have a tendency that nonuniformity of emission luminance becomes smaller toward the center and larger toward the end. In the mean time, a range of correctable intra-block emission luminance has a limitation. Accordingly, by increasing the number of light emitting devices belonging to a block in the center and decreasing the number of light emitting devices in the end, it is possible to reliably smooth the intra-block emission luminance while smoothing the emission luminance on the whole of the optical heads.

An optical head having a plurality of light emitting devices according to a second aspect of the invention, includes: a first adjusting unit (for example, reference numerals DMP1 to DMPn shown in FIG. 4) that divides the plurality of light emitting devices into a plurality of blocks by grouping adjacent light emitting devices of the plurality of light emitting devices, and adjusts levels of driving signals supplied to the adjacent light emitting devices for each of the plurality of blocks so that emission luminances of the adjacent light emitting devices belonging to the each of the plurality of blocks become substantially equal to each other; and a second adjusting unit (for example, reference numerals U1 to U4 shown in FIG. 4) that adjusts emission periods so that the equalized emission luminances of the plurality of blocks become substantially equal to each other.

According to the second aspect of the invention, since the adjacent light emitting devices are grouped and divided into a plurality of blocks, intra-block nonuniformity of emission luminance is corrected by adjusting the level of driving signal using the first adjusting unit, and inter-block nonuniformity of emission luminance is corrected by adjusting the emission period using the second adjusting unit, it is possible to correct nonuniformity of emission luminance of the whole of the optical head. In addition, since the correction of the emission luminance is based on two factors, that is, the level of driving signal and the emission period, a range of change of the factors can be narrowed as compared to a case of correction by a single factor.

Preferably, the first adjusting unit includes a plurality of unit circuits (for example, reference numerals U1 to U4 shown in FIG. 4) provided on a one-to-one basis for the adjacent light emitting devices belonging to the each of the plurality of blocks, and the plurality of unit circuits generate driving signals (for example, reference numeral Iel shown in FIG. 4) having levels defined such that luminances of the adjacent light emitting devices belonging to the each of the plurality of blocks become substantially equal to a target luminance in a time period during which driving control signals (for example, reference numerals d11' to d14' shown in FIG. 4) are effective. The second adjusting unit includes a plurality of logic circuits (for example, reference numeral 22 shown in FIG. 4) that supply the driving control signal to the plurality of unit circuits belonging to the each of the plurality of blocks, and each of the plurality of logic circuits calculates a logical product of a lighting control signal (for example, reference numerals d11 to d14 shown in FIG. 4) to specify turning-on or turning-off of each of the adjacent light emitting devices belonging to the each of the plurality of blocks and an emission period control signal (for example, reference numeral E1 shown in FIG. 4) to specify the emission period set for the corresponding block and generates the driving control signal based on the calculated logical product. The emission period control signal specifies the emission period for each block of the plurality of blocks so that inter-block emission luminances become equal to each other by correcting the target luminance set for the each block of the plurality of blocks. According to this aspect of the invention, inter-block correction of emission luminance can be made by the logic circuits using the emission period control signal, and intra-block correction of emission luminance can be made by the unit circuits.

Preferably, a data signal obtained by time-division multiplexing the lighting control signal for each block of the plurality of blocks is supplied. The emission period control signal is commonly supplied to the plurality of logic circuits belonging to the corresponding block. The second adjusting unit includes a plurality of latch circuits that are provided corresponding to the plurality of logic circuits belonging to the corresponding block and each generates the light control signal by latching the data signal. According to this aspect of the invention, since a common emission period control signal is supplied to the blocks and the logic circuits calculate the logical product of the lighting control signal and the emission period control signal to generate the driving control signal, it is possible to adjust the intra-block emission luminance.

Preferably, a data signal including a plurality of the lighting control signals and obtained by time-division multiplexing the lighting control signal for each block of the plurality of blocks is supplied. The second adjusting unit includes a plurality of latch circuits that are provided corresponding to the plurality of logic circuits belonging to the corresponding block and generate the plurality of the lighting control signals by latching the data signal based on a plurality of selection signals for selecting the plurality of the lighting control signals included in the data signal. The emission period control signal corresponding to one of the plurality of blocks is constituted by individual emission period control signals corresponding to the plurality of unit circuits belonging to the one of the plurality of blocks. The plurality of individual emission period control signals (for example, reference numerals E11 to E14 shown in FIG. 8) corresponding to one of the plurality of blocks (for example, reference numeral B1 shown in FIG. 8) have a substantially same length of specified emission period and have different startings of the emission period depending on corresponding selection signals (for example, reference numerals SEL1' to SEL4' shown in FIG. 8). In this case, since the individual emission period control signals are used to set startings of the emission period according to the selection signals, when it is assumed that a period during which one gray scale is represented is a unit period, it is possible to increase a ratio of the emission period to the unit period. As a result, it is possible to decrease a level of driving signal required to obtain desired emission luminance, thereby making it possible to simplify a configuration of a unit circuit.

An image forming apparatus according to a third aspect of the invention includes: an optical head according to the second aspect; and an image carrier on which an image is formed by light emitted from the optical head. With the third aspect, the effects of the first and second aspects can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be hereinafter described with reference to the accompanying drawings in which like elements are denoted by like reference numerals.

First Embodiment

Figure 1:
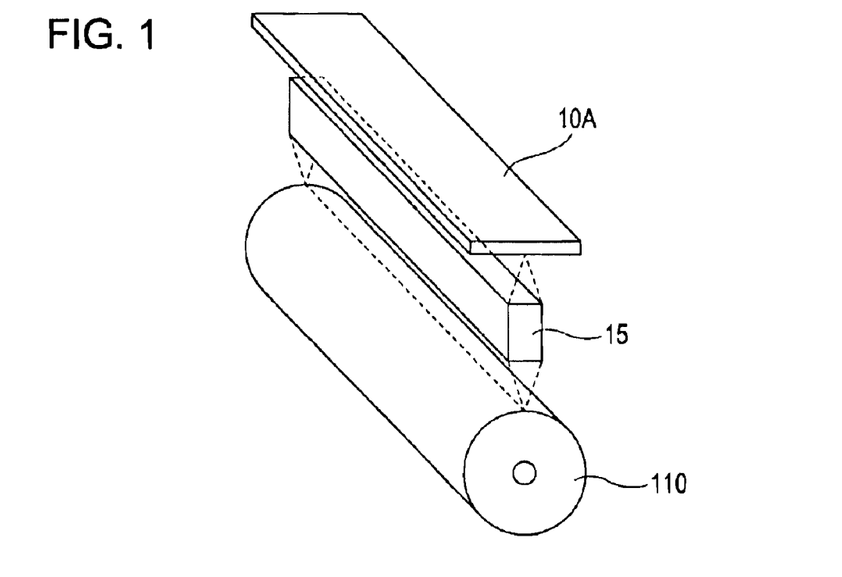
FIG. 1 is a perspective view showing a configuration of a portion of an image forming apparatus using an optical head according to a first embodiment of the invention.

FIG. 1 is a perspective view showing a configuration of a portion of an image forming apparatus using an optical head according to a first embodiment of the invention. As shown in FIG. 1, the image forming apparatus includes an optical head 10A, a condensing lens array 15 and a photoconductive drum (image carrier) 110. The optical head 10A includes a plurality of light emitting devices arranged in the form of an array. These light emitting devices emit light selectively depending on an image to be printed on a recording material such as a paper. A light emitting device may be any device if only it can form an electrostatic latent image on the photoconductive drum 110. In the embodiment, for example, an OLED (organic light emitting diode) device may be used as the light emitting device. The condensing lens array 15 is interposed between the optical head 10A and the photoconductive drum 110. The condensing lens array 15 includes a plurality of gradient index lenses arranged in the form of an array, with their respective optical axes directing to the optical head 10A. The light emitted from the light emitting devices of the optical head 10A passes through the gradient index lenses of the condensing lens array 15 and is focused on a surface of the photoconductive drum 110. While the photoconductive drum 110 is rotated, an electrostatic latent image according to a desired image is formed at a predetermined exposure position on the surface of the photoconductive drum 110.

Figure 2:
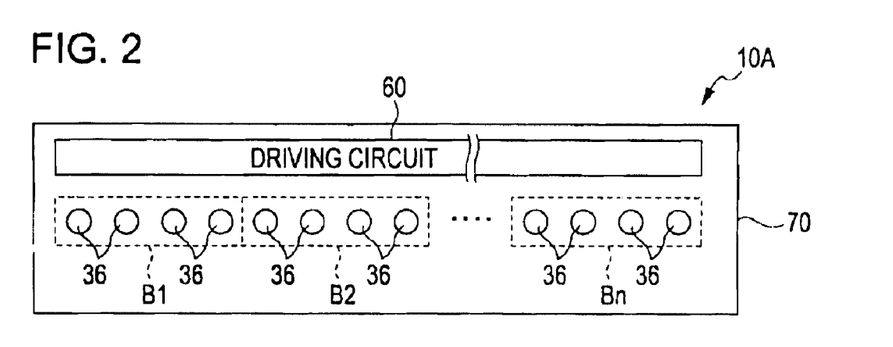
FIG. 2 is a plan view showing a configuration of the optical head.

FIG. 2 shows a rough mechanical configuration of an optical head 10A. As shown in FIG. 2, the optical head 10A includes a plurality of light emitting devices 36 and a driving circuit 60 formed on a glass substrate 70. The plurality of light emitting devices 36 is arranged in a main scan direction and is divided into n blocks (n is an integer of 2 or more). In this embodiment, the number of light emitting devices 36 belonging to each block B1 to Bn. That is, in this embodiment, the optical head 10A includes in light emitting devices (n is a natural number) arranged in the main scan direction.

Figure 3:
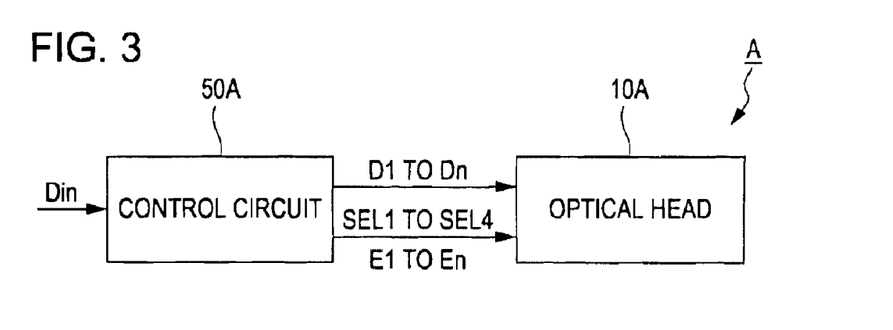
FIG. 3 is a block diagram showing a configuration of an exposure apparatus.

FIG. 3 is a block diagram of an exposure apparatus A using the optical head 10A. As shown in FIG. 3, the exposure apparatus A includes a control circuit 50A and the optical head 10A. The control circuit 50A generates signals D1 to Dn, selection signals SEL1 to SEL4 and emission control signals E1 to En corresponding to the blocks B1 to Bn, respectively, based on input image data Din supplied from a high level apparatus. Assuming that 1≦i≦n (i is an integer), a data signal Di is a signal obtained by time-division multiplexing a lighting control signal to specify light-on or light-off of four light emitting devices 36 belonging to an i-th block Bi.

The selection signals SEL1 to SEL4 are signals used for a demultiplexing process of the data signal Di. Lighting control signals corresponding to the four light emitting devices 36 are obtained by latching the data signal Di using the selection signals SEL1 to SEL4. The emission control signals E1 to En are signals to specify an emission period for each block. As will be described in detail, in this embodiment, a level of driving current of the light emitting devices 36 is adjusted to meet target luminance defined for each block, and the emission period for each block is controlled to make emission luminance between blocks equal.

Figure 4:
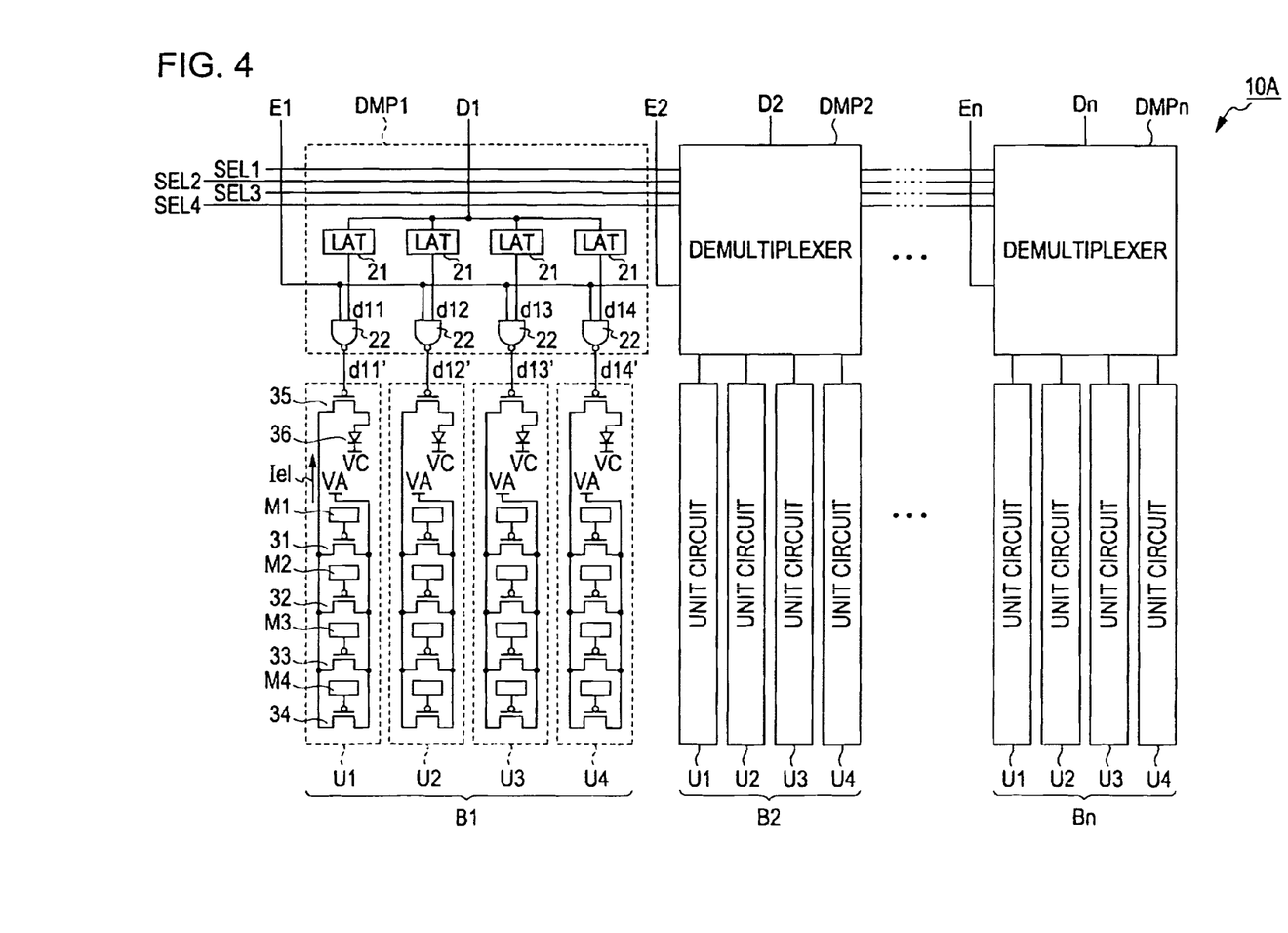
FIG. 4 is a circuit diagram showing a configuration of the optical head.

FIG. 4 is a block diagram of the optical head 10A. The optical head 10A includes n demultiplexers DMP1 to DMPn corresponding to n blocks B1 to Bn, and four unit circuits U1 to U4 for each block. Although FIG. 4 shows details of the demultiplexer DMP1 and the unit circuits U1 to U4 for the block B1, this may be equally applied to other blocks B2 to Bn.

Figure 5:
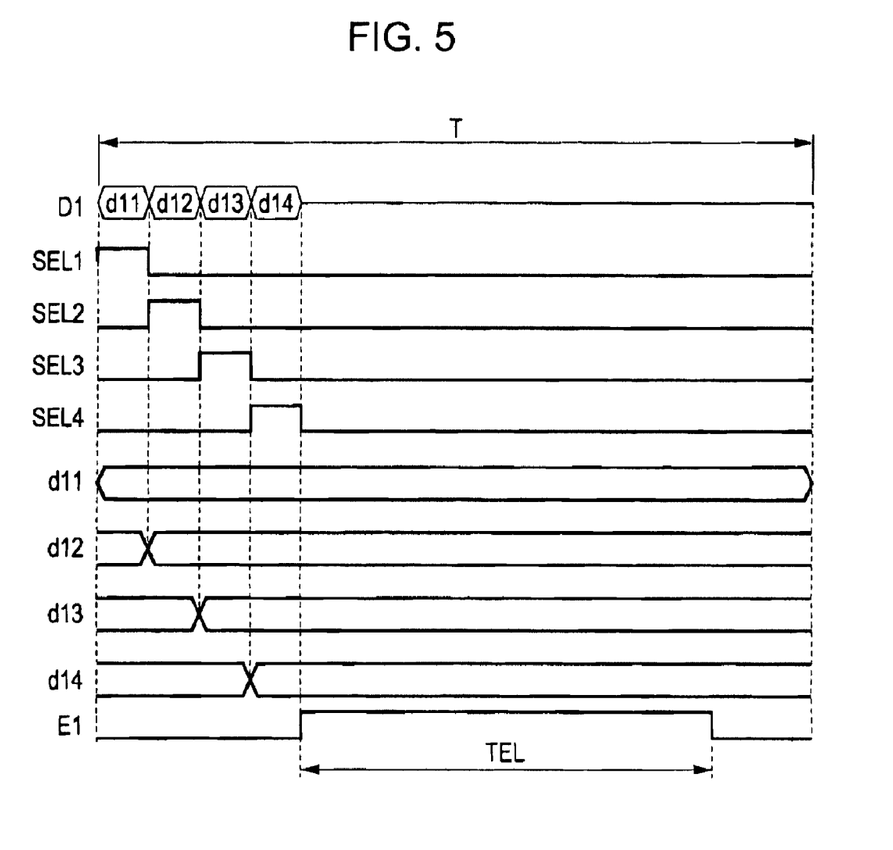
FIG. 5 is a timing chart showing an operation of the optical head.

The demultiplexer DMP1 includes four latch circuits 21 and four NAND circuits 22. The latch circuits 21 latch the data signal D1 by the selection signals SEL1 to SEL4, respectively. As shown in FIG. 5, the data signal D1 is supplied to the optical head 10A from the start of a unit period T, and the selection signals SEL1 to SEL4, which become active sequentially in synchronization with the data signal D1, are supplied to the optical head 10A. As the latch circuits 21 latch the data signal D1 in a period during which the selection signals SEL1 to SEL4 become active, lighting control signals d11 to d14 are obtained as shown in FIG. 5.

The lighting control signals d11 to d14 are respectively supplied to one input terminals of the four NAND circuits 22, and an emission period control signal E1 is commonly supplied to the other input terminals of the NAND circuits 22. Accordingly, emission periods TEL of the four light emitting devices 36 belonging to the block B1 become equal to each other. In addition, the emission period control signal E1 becomes active in periods other that the period during which one of the selection signals SEL1 to SEL4 becomes active. In this embodiment, assuming that a period during which one gray scale is represented is T, the selection signals SEL1 to SEL4 are collected at the start of the unit period T as shown in FIG. 5. This is for preventing an error signal in a sampling period during which the selection signals SEL1 to SEL4 become active from being reflected on a lighting operation. That is, the emission period control signal E1 provided for correction has an effect of prevention of erroneous lighting as well.

The unit circuit U1 includes a driving transistor 35, a light emitting device 36 and a current digital-analog converter (current DAC). On/Off of the driving transistor 35 is controlled by a driving control signal d11' having an emission period limited by the emission period control signal E1. The effective emission luminance of the light emitting device 36 is defined by the product of an emission period and intensity of driving current Iel supplied from the driving transistor 35. The intensity of driving current Iel is defined by the current DAC.

The current DAC includes transistors 31 to 34 and memories M1 to M4. In this embodiment, the size of the transistors 31 to 34 is set to be a ratio of 1:2:4:8. In the memories M1 to M4 are stored a potential turning the transistors 31 to 34 into an off state and a potential turning the transistors 31 to 34 into an on state, respectively. The potential turning the transistors 31 to 34 into the on state is common for the memories M1 to M4. Accordingly, the intensity of driving current Iel is controlled with 4-bit correction data stored in the memories M1 to M4. In this embodiment, the correction data are stored in the memories M1 to M4 to meet target luminance defined for each block.

The reason for two-step correction of smoothness of intra-block emission luminance and smoothness of inter-block emission luminance is as follows. That is, although nonuniformity of the emission luminance of the light emitting devices 36 is large on the whole of the optical head 10A, there is little possibility that maximum and minimum values of nonuniformity are locally concentrated. In other words, although nonuniformity of the optical head 10A is large, nonuniformity in divided blocks is small. Accordingly, intra-block emission luminance nonuniformity is corrected using the current DAC having a relatively small number of bits, and inter-block emission luminance nonuniformity is corrected by adjusting an emission period. That is, relatively small intra-block emission luminance nonuniformity is corrected by adjusting the intensity of driving current, while relatively large inter-block emission luminance nonuniformity is corrected by adjusting the emission period.

If the emission luminance of the whole of the optical head 10A is to be uniformly corrected by adjusting only the intensity of driving current, it is required to significantly increase the number of bits of the current DAC, thereby needing a large scale circuit. If the emission luminance of the whole of the optical head 10A is to be uniformly corrected by adjusting only the length of the emission period, it is required to perform a high speed sampling operation of the data signals or provide an emission period control signal for each light emitting device. However, since the length of the optical head 10A is defined by the width of print sheet, the length becomes large as compared to semiconductor integrated circuits. Accordingly, it is required to draw various signal lines such as lines for the selection signals SEL1 to SEL4 by a long distance, thereby making it difficult to transfer data at a high speed. In addition, considering the number of terminals, it is actually impossible to provide the emission period control signal for each light emitting device. On the contrary, in the optical head 10A of this embodiment, since two kinds of correction, that is, the intra-block correction and the inter-block correction, are made, it is possible to make the emission luminance of the whole of the optical head 10A uniform with a simple structure.

Now, a process of emission luminance correction will be described in more detail with reference to FIG. 6. In this embodiment, it is assumed that the number of blocks of the optical head 10A is 4. Assuming that an upper limit of an emission luminance distribution is 100, the 4-bit current DAC can correct an output current value up to about 66 to 100 or so. This is an example where a current source by a transistor having a channel width corresponding to 3.3% of a channel width of a transistor constituting a basic current source is the gray scale current unit. In general, it is preferable that emission luminance after correction falls within a range of ±2% or so of a target value for a printer light source. In this embodiment, the emission luminance nonuniformity before correction in the optical head 10A is 50 in its minimum value and 100 in its maximum value. If the whole of the optical head 10A is corrected by only the 4-bit current DAC with the emission period fixed, there exists uncorrectable place as shown in FIG. 7.

Figure 6:
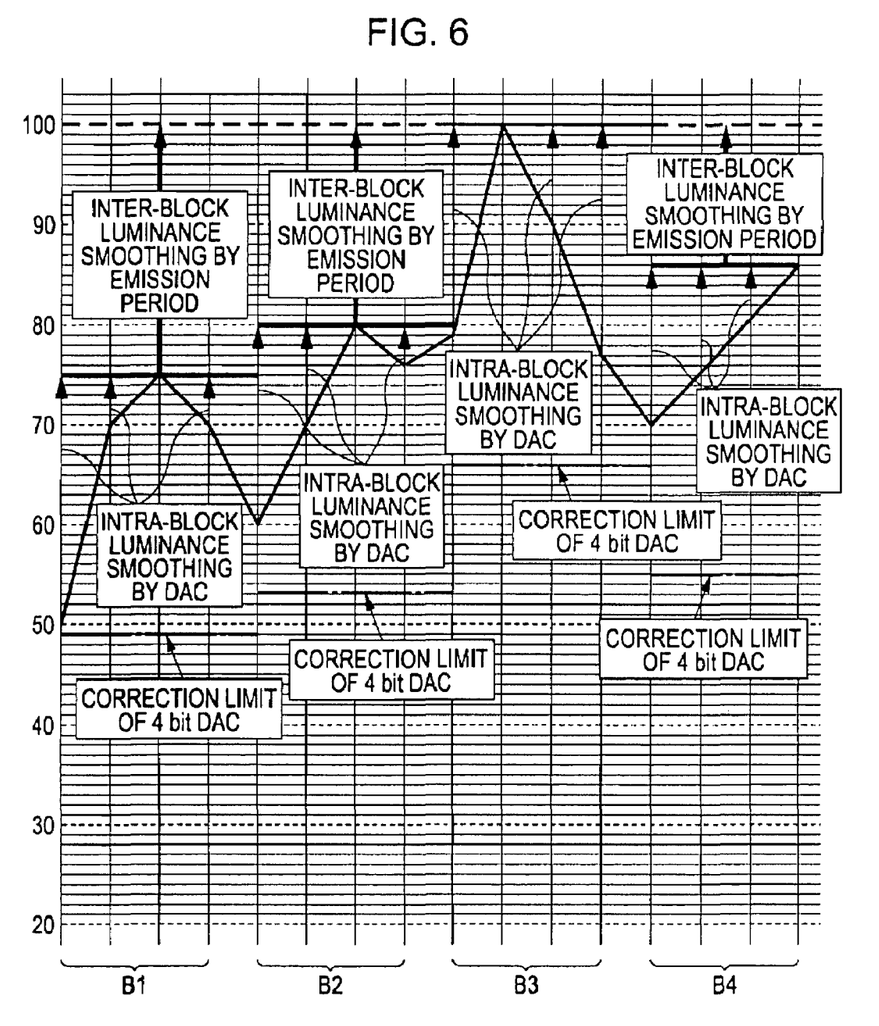
FIG. 6 is an explanatory view explaining a relationship between intra-block correction and inter-block correction.
Figure 7:
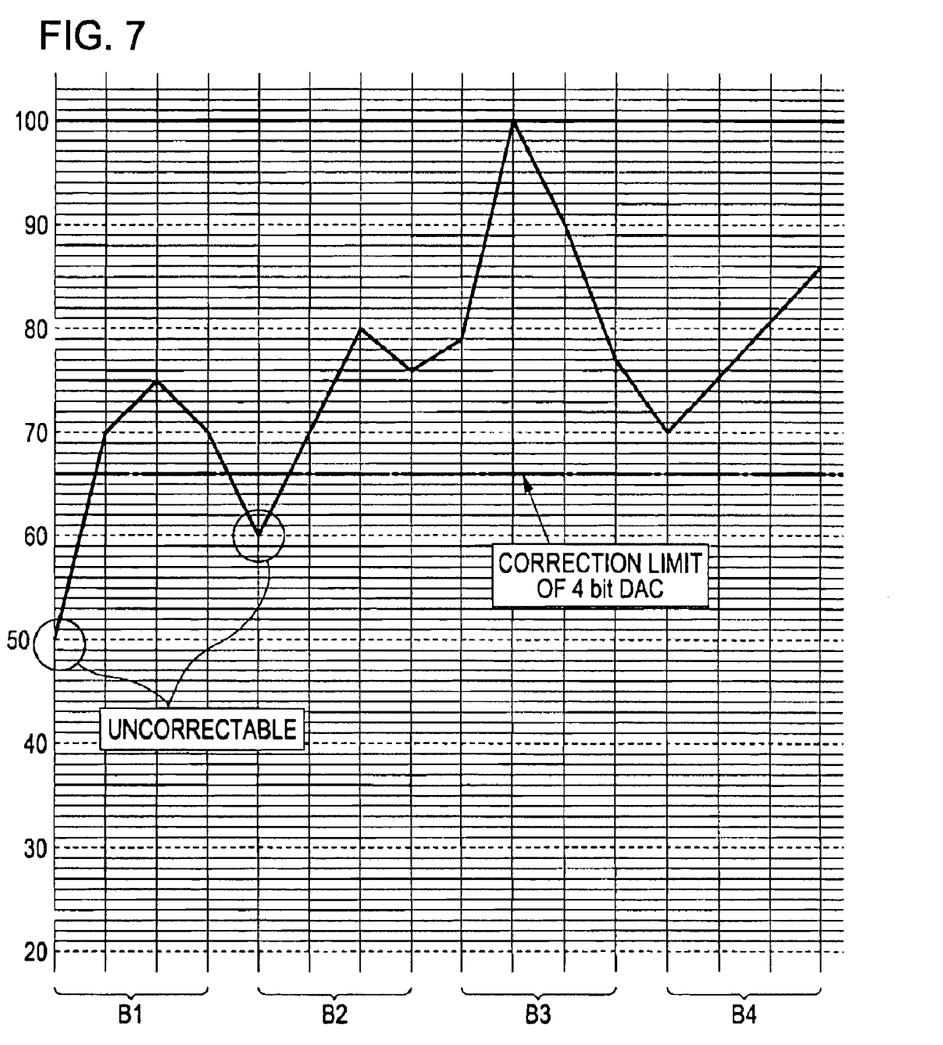
FIG. 7 is an explanatory view explaining intra-block correction in a comparative example.

In the mean time, in the configuration of this embodiment, as shown in FIG. 6, the maximum and minimum values of the emission luminance for the block B1 are 75 and 50, respectively, and a correctable lower limit is about 49. Accordingly, intra-block smoothness is possible with the 4-bit current DAC. For the block B2, the maximum and minimum values of the emission luminance are 81 and 60, respectively, a correctable lower limit is about 53, and accordingly, intra-block smoothness is possible with the 4-bit current DAC. For the block B3, the maximum and minimum values of the emission luminance are 100 and 71, respectively, a correctable lower limit is about 66, and accordingly, intra-block smoothness is possible with the 4-bit current DAC. For the block B4, the maximum and minimum values of the emission luminance are 86 and 71, respectively, a correctable lower limit is about 55, and accordingly, intra-block smoothness is possible with the 4-bit current DAC. Here, it is assumed that a period corresponding to 50% of one unit period T in each block B1 to B4 is set to be the emission period TEL. In addition, for each block B1 to B4, it is assumed that the driving current Iel is adjusted with the maximum value of the emission luminance distribution before correction as target luminance.

Next, the inter-block emission period control signals E1 to E4 are adjusted and the emission period TEL is adjusted. 50% emission period TEL for the block B1 is reset to be about 66.7%, 50% emission period TEL for the block B2 is reset to be about 62.5%, 50% emission period TEL for the block B3 remains unchanged, and 50% emission period TEL for the block B4 is reset to be about 58.1%. This allows the effective emission luminance to be substantially uniformly corrected on the whole of the optical head 10A. In addition, if the emission luminance of the whole of the optical head 10A is to be varied by X %, the emission period TEL for each emission period control signal E1 to En may be varied by X %.

In this embodiment, a range of change of the emission luminance by the adjustment of the emission period TEL is set to increase as compared to a range of change of the emission luminance by the adjustment of the driving current Iel. This allows the relatively small nonuniformity of the intra-block emission luminance to be smoothed with relatively small number of bits and allows the relatively large nonuniformity of the inter-block emission luminance to be corrected by adjusting the emission period TEL.

Second Embodiment

In the above-described first embodiment, the control circuit 50A concentrates the period during which the selection signals SEL1 to SEL4 become active at the start of the unit period T representing one gray scale, and assigns the emission period TEL to the period during which the selection signals SEL1 to SEL4 become inactive during the unit period T. Accordingly, assuming that the period during which the selection signals SEL1 to SEL4 become active is ΔT, a ratio of the emission period TEL to the unit period T is limited to (T−4ΔT)/T at the maximum. In the second embodiment, the ratio of the emission period TEL to the unit period T is increased as compared to the first embodiment.

Figure 8:
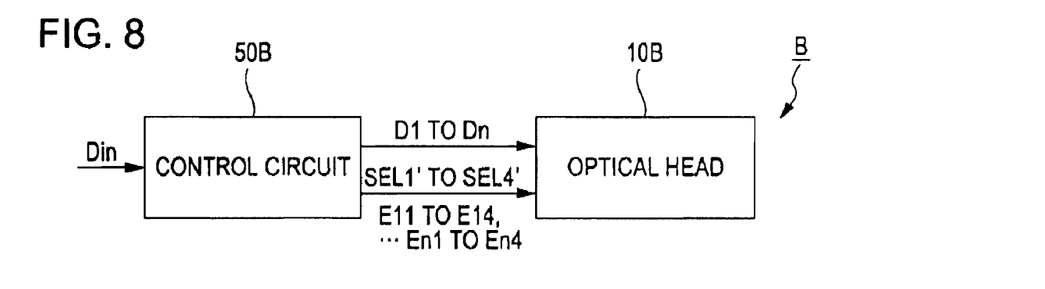
FIG. 8 is a block diagram showing a configuration of an exposure apparatus according to a second embodiment of the invention.

FIG. 8 is a block diagram of an exposure apparatus according to the second embodiment. A control circuit 50B generates selection signals SEL1' to SEL4' distributed in the unit period T and generates emission period control signals E11 to E14, E21 to E24, . . . , and En1 to En4 corresponding to the blocks B1 to Bn.

Figure 9:
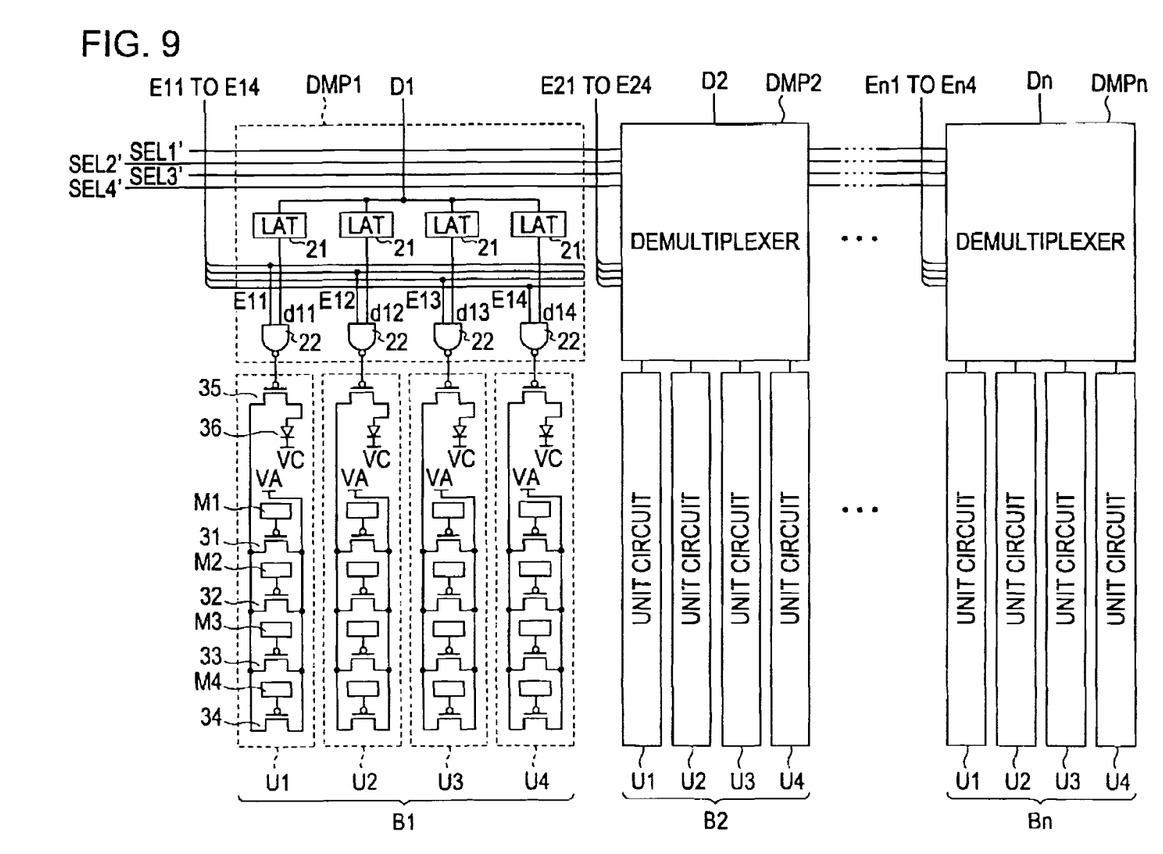
FIG. 9 is a circuit diagram showing a configuration of an optical head.
Figure 10:
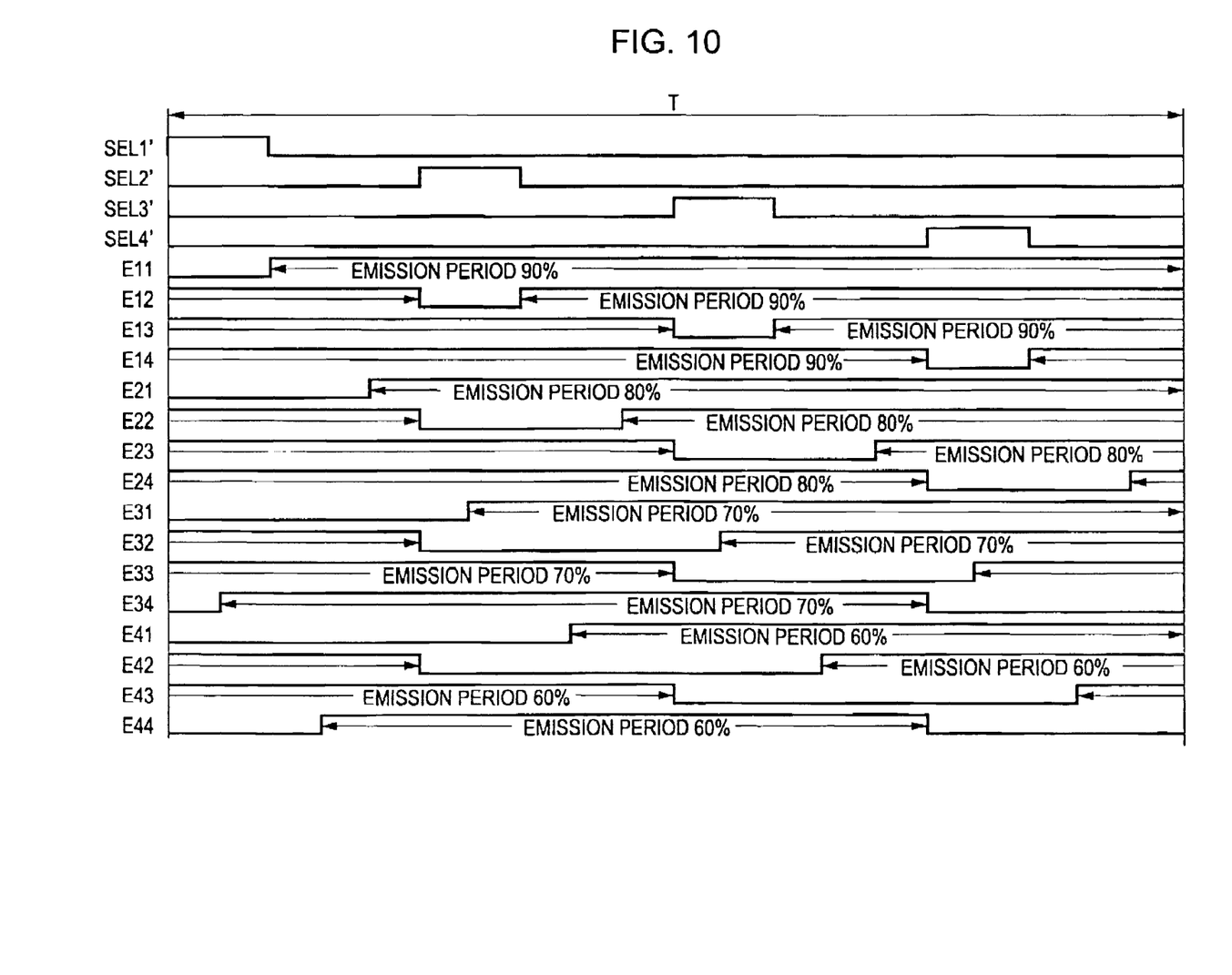
FIG. 10 is a timing chart showing an operation of the optical head.

FIG. 9 is a block diagram of an optical head 10B according to the second embodiment, and FIG. 10 is a timing chart thereof. The optical head 10B has the same structure as the optical head 10A of the first embodiment shown in FIG. 4, except for detailed configuration of demultiplexers DMP1' to DMPn'. For the demultiplexer DMP1', the data d11 to d14 are respectively supplied to one input terminals of the NAND circuits 22, and the emission period control signals E11 to E14 are respectively supplied to the other input terminals of the NAND circuits 22. For these emission period control signals E11 to E14, a start timing of the emission period TEL is set in synchronization with falling of the selection signals SEL1' to SEL4', and intervals from the start of the emission period TEL to the end thereof are set to be equal to each other. Here, assuming that a ratio of the period ΔT during which the selection signals SEL1' to SEL4' becomes active to the unit period T is 10%, the emission period TEL can be set to be 90% at the maximum as shown in FIG. 10.

In the first embodiment, since the emission period TEL is assigned in the latter half portion of the unit period T, it was required to make the ratio of the emission period TEL to the unit period T small, and thus it was required for each light emitting device 36 to supply large current to obtain desired emission luminance. On the contrary, in the second embodiment, since the ratio of the emission period TEL to the unit period T can be increased, it is possible to make the intensity of driving current supplied to the light emitting devices 36 small to obtain the desired emission luminance. As a result, it is possible to make the size of the transistors 31 to 36 constituting the unit circuits U1 to U4 small.

Modification

The invention is not limited to the above-described embodiment, but may be modified as follows.

(1) Although the OLED devices were employed as an example of the light emitting devices 36 in the above-described embodiments, the light emitting devices 36 may be inorganic light emitting diodes. In a word, the light emitting devices 36 may be any devices as long as they can emit light with emission luminance depending on a level of driving signal. For example, the light emitting devices 36 may include field emission devices (FEDs), surface-conduction electron-emitter devices (SEDs), ballistic electron surface emitting devices (BSDs), etc.

(2) Although it has been illustrated in the above-described embodiments that the number of light emitting devices 36 included in each block B1 to Bn, the number of light emitting devices 36 may be two or more. In addition, the number of light emitting devices 36 included in each block B1 to Bn may not be necessarily identical. Light emitting devices 36 arranged in one direction have a tendency that nonuniformity of emission luminance becomes smaller toward the center and larger toward the end. In the mean time, a range of correctable intra-block emission luminance has a limitation. Accordingly, by increasing the number of light emitting devices belonging to a block in the center and decreasing the number of light emitting devices in the end, it is possible to reliably smooth the intra-block emission luminance while smoothing the emission luminance on the whole of the optical heads 10A and 10B. That is, in two adjacent blocks of the plurality of blocks B1 to Bn, it is preferable that the number of light emitting devices 36 belonging to a block at the center side is larger than the number of light emitting devices 36 belonging to a block at the end side.

Image Forming Apparatus

Figure 11:
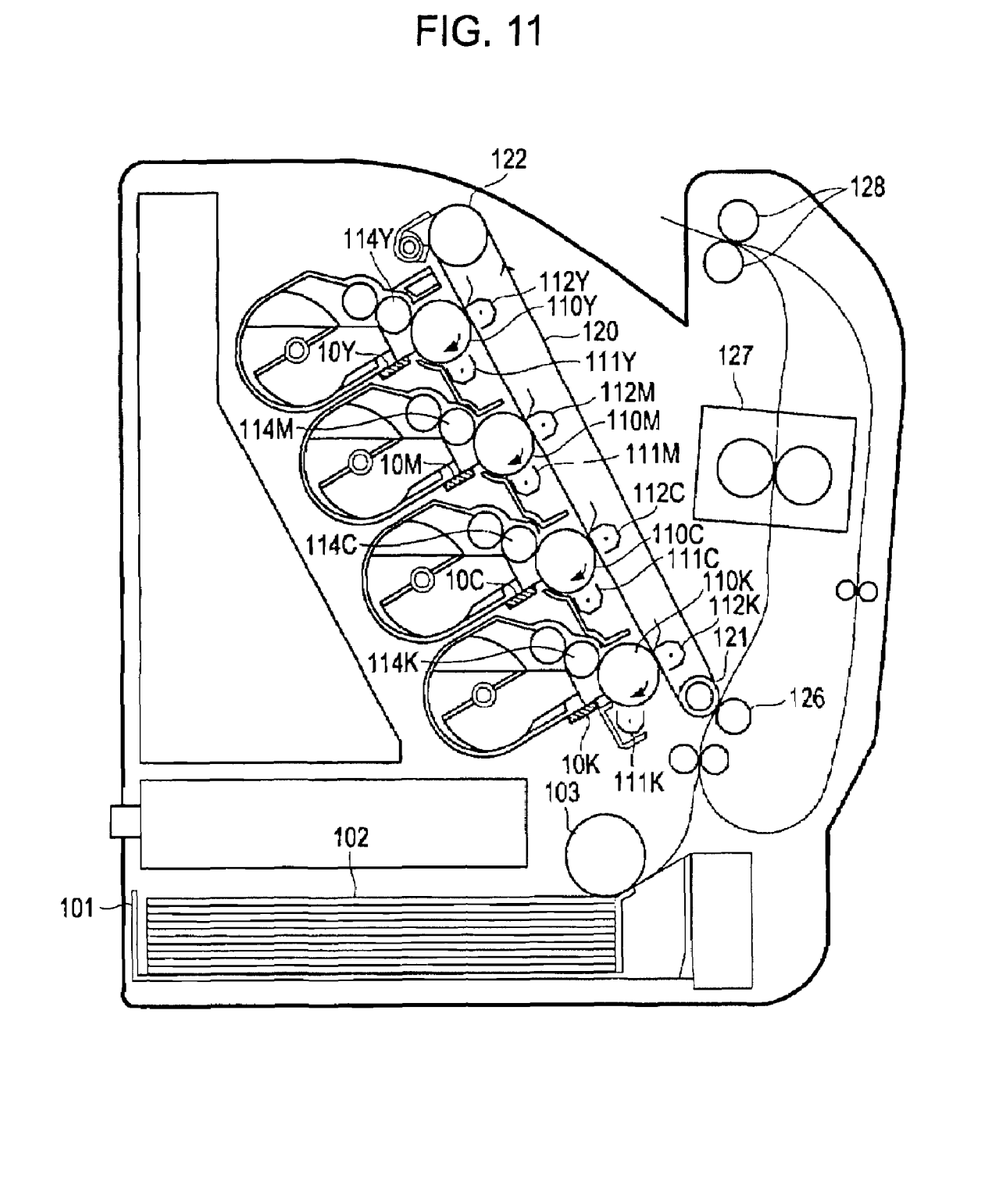
FIG. 11 is a longitudinal sectional view showing a configuration of an image forming apparatus using an optical head according to an embodiment of the invention.

The optical heads 10A and 10B according to the above-described embodiments and modification may be used as a line type optical head for forming an electrostatic latent image on an image carrier in an electrophotography-based image forming apparatus. An example of the image forming apparatus may include a printer, a printing unit of a copy machine, a printing unit of a facsimile machine, etc. FIG. 11 is a longitudinal sectional view showing an example of an image forming apparatus using the optical head 10A or 10B as a line type optical head. The shown image forming apparatus is a tandem type full color image forming apparatus using a belt intermediate transfer body system.

In this image forming apparatus, an array of 4 organic EL devices 10K, 10C, 10M and 10Y having the same structure are disposed at exposure positions of 4 photoconductive drums (image carriers) 110K, 110C, 110M and 110Y having the same structure, respectively. The array of organic EL devices 10K, 10C, 10M and 10Y corresponds to the optical head 10A or 10B according to the above-described embodiments and modification.

As shown in FIG. 11, this image forming apparatus is provided with a driving roller 121 and a driven roller 122. An endless intermediate transfer belt 120 is wound on these rollers 121 and 122 and is revolved around the rollers 121 and 122 as indicated by an arrow. Although not shown, there may be provided a tension roller or the like for granting tension to the intermediate transfer belt 120.

The four photoconductive drums 110K, 110C, 110M and 110Y having photosensitive layers formed on their respective circumference are disposed with a predetermined interval therebetween around the intermediate transfer belt 120. Suffixes K, C, M and Y are used to mean black, cyan, magenta and yellow development, respectively. This is true of other members. The photoconductive drums 110K, 110C, 110M and 110Y are rotated in synchronization with the driving of the intermediate transfer belt 120.

Corona chargers 111K, 111C, 111M and 11Y, the organic EL devices 10K, 10C, 10M and 10Y, and developing devices 114K, 114C, 114M and 114Y are disposed around the photoconductive drums 110K, 110C, 110M and 110Y, respectively. The corona chargers 111K, 111C, 111M and 111Y charge circumferences of respective photoconductive drums 110K, 110C, 110M and 110Y uniformly. The organic EL devices 10K, 10C, 10M and 10Y form electrostatic latent images on the charged circumference of the respective photoconductive drums. The organic EL devices 10K, 10C, 10M and 10Y are installed such that an arrangement direction of a plurality of light emitting devices P lies along a parent line (main scan direction) of the respective photoconductive drums 110K, 110C, 110M and 110Y. The electrostatic latent images are formed by irradiating the photoconductive drums with light emitted from the plurality of light emitting devices P. The developing devices 114K, 114C, 114M and 114Y develop the photoconductive drums (that is, form visible images) by attaching toner as developer to the electrostatic latent images.

Developments of black, cyan, magenta and yellow images formed by 4 monochromatic development formation stations are primarily transferred into the intermediate transfer belt 120 sequentially and thus are superimposed on the intermediate transfer belt 120, thereby obtaining a full color development. Four primary transfer corotrons (transcribers) 112K, 112C, 112M and 112Y are disposed at an inner side of the intermediate transfer belt 120. The primary transfer corotrons 112K, 112C, 112M and 112Y are disposed near the photoconductive drums 110K, 110C, 110M and 110Y, respectively, and transfer the developments into the intermediate transfer belt 120 passing between the photoconductor drums and the primary transfer corotrons by electrostatically absorbing the developments from the photoconductive drums 110K, 110C, 110M and 110Y.

Sheets 102 as objects on which images are finally formed are fed one by one from a sheet supply cassette 101 by means of a pickup roller 103 and is sent to a nip between the intermediate transfer belt 120 contacting the driving roller 121 and a secondary transfer roller 126. Full color development on the intermediate transfer belt 120 is collectively secondary transferred into one side of the sheet 102 by means of the secondary transfer roller 126 and is fixed on the sheet 102 when the sheet 102 passes through a pair of fixing rollers 127 as a fixing unit. Thereafter, the sheet 102 is discharged to a sheet discharge cassette formed on an upper side of the apparatus.

Next, an image forming apparatus according to another embodiment of the invention will be described.

Figure 12:
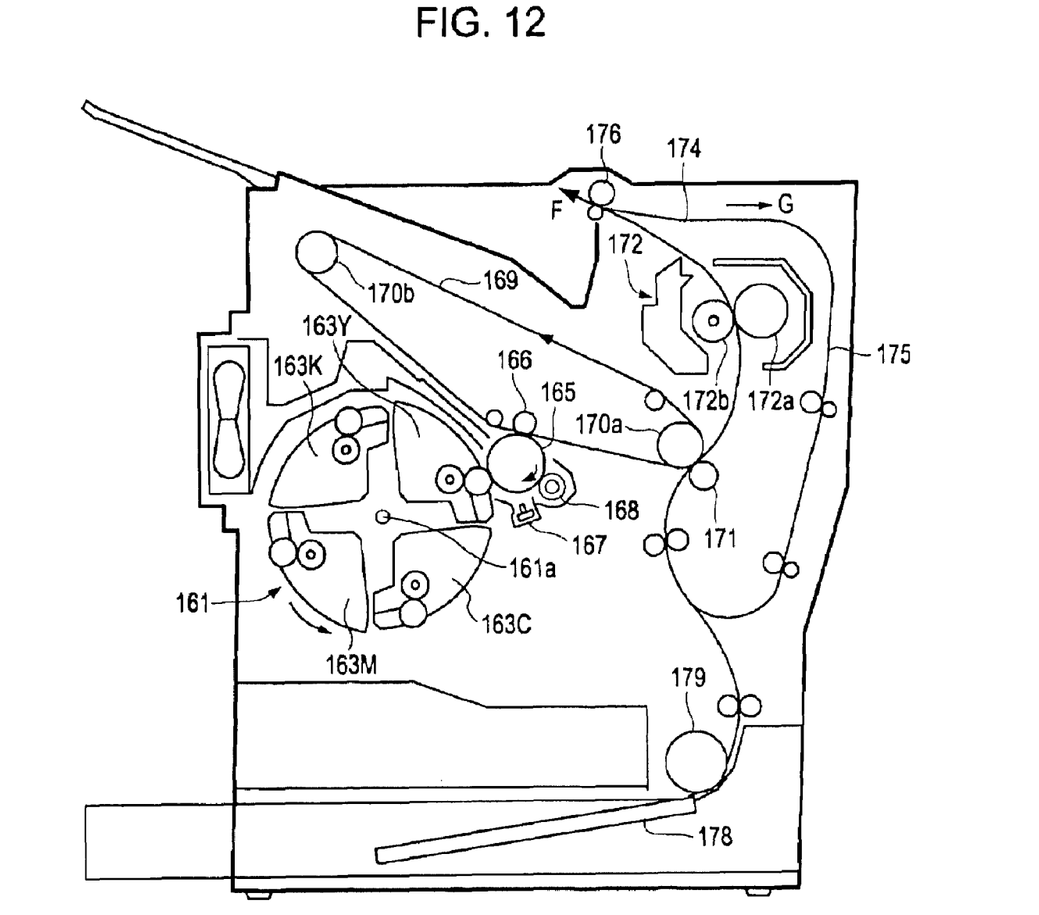
FIG. 12 is a longitudinal sectional view showing a configuration of another image forming apparatus using an optical head according to an embodiment of the invention.

FIG. 12 is a longitudinal sectional view of another image forming apparatus using the optical head 10A or 10B as a line type optical head. The shown image forming apparatus is a rotary development type full color image forming apparatus using a belt intermediate transfer body system. In the image forming apparatus shown in FIG. 12, a corona charger 168, a rotary development unit 161, an organic EL array 167 and an intermediate transfer belt 169 are disposed around a photoconductive drum 165.

The corona charger 168 charges the circumference of the photoconductive drum 165 uniformly. The organic EL array 167 forms an electrostatic latent image on the charged circumference of the photoconductive drum 165. The organic EL array 167 is the optical head 10A or 10B and is installed such that an arrangement direction of a plurality of light emitting devices P lies along a parent line (main scan direction) of the photoconductive drum 165. The electrostatic latent image is formed by irradiating the photoconductive drum 165 with light emitted from the plurality of light emitting devices P.

The developing unit 161 is a drum having four developing devices 163Y, 163C, 163M and 163K disposed with an angular interval of 90° therebetween and can be rotated counterclockwise around an axis 161a. The developing devices 163Y, 163C, 163M and 163K supply yellow, cyan, magenta and black toner to the photoconductive drum 165, respectively, to develop the photoconductive drum 165 (that is, form a visible image) by attaching the toner as developer to the electrostatic latent image.

The endless intermediate transfer belt 169 is wound on a driving roller 170a, a driven roller 170b, a primary transfer roller 166 and a tension roller and is revolved around these rollers in a direction indicated by an arrow. The primary transfer roller 166 transfers the development into the intermediate transfer belt 169 passing between the photoconductor drum and the primary transfer roller 169 by electrostatically absorbing the development from the photoconductive drum 165.

Specifically, with the first one rotation of the photoconductive drum 165, the organic EL array 167 forms an electrostatic latent image for a yellow (Y) image on the photoconductive drum 165, the developing device 163Y forms the yellow development, and the yellow development is transferred into the intermediate transfer belt 169. In addition, with the next one rotation of the photoconductive drum 165, the organic EL array 167 forms an electrostatic latent image for a cyan (C) image on the photoconductive drum 165, the developing device 163C forms the cyan development, and the cyan development is transferred into the intermediate transfer belt 169 to be superimposed on the yellow development. In this manner, during four rotations of the photoconductive drum 165, yellow, cyan, magenta and black developments are sequentially superimposed each other on the intermediate transfer belt 169, thereby forming a full color development on the intermediate transfer belt 169. If an image is to be formed on both sides of a sheet as an object on which the image is finally formed, the same color development of front and rear sides of the sheet is transferred into the intermediate transfer belt 169, and thereafter, the next color development of front and rear sides of the sheet is transferred into the intermediate transfer belt 169. In this manner, a full color development is obtained on the intermediate transfer belt 169.

The image forming apparatus is provided with a sheet transport path 174 through which sheets pass. The sheet are picked up one by one by a pickup roller 179, travel along the sheet transport path 174 by a transport roller, and pass through a nip between the intermediate transfer belt 169 contacting the driving roller 170a and a secondary transfer roller 171. The secondary transfer roller 171 transfers the full color development into one side of sheet by electrostatically absorbing the full color development from the intermediate transfer belt 169 collectively. The secondary transfer roller 171 becomes close to or distant from the intermediate transfer belt 169 by a clutch (not shown). When the full color development is transferred into the sheet, the secondary transfer roller 171 contacts the intermediate transfer roller 171. While the transfer of development into the intermediate transfer belt 169 continues, the intermediate transfer belt 169 is separated from the secondary transfer roller 171.

The sheet onto which the image is transferred is transported to a fixing unit 172, and the development on the sheet is fixed when the sheet passes between a heating roller 172a and a pressing roller 172b of the fixing unit 172. The sheet after the fixing treatment is led between a pair of sheet discharge rollers 176 and travels along an arrow F. In case of double-sided print, after the most part of the sheet passes through the pair of sheet discharge rollers 176, the pair of sheet discharge rollers 176 is reversely rotated, and the sheet is introduced into a double-sided print transport path 175 as indicated by an arrow G. Then, development is transferred into the other side of the sheet by the secondary transfer roller 171 and then is fixed by the fixing unit 172, and then the sheet is discharged to the pair of sheet discharge rollers 176.

Since the image forming apparatuses shown in FIGS. 11 and 12 use the light emitting devices 36 as an exposure means, it is possible to make the apparatuses smaller than those using a laser scan optical system. In addition, the optical head of the invention can be employed for electrophotography-based image forming apparatuses other than those described and shown in the above. For example, the optical head of the invention can be applied to image forming apparatuses of a type that development is directly transferred into a sheet from a photoconductive drum without using an intermediate transfer belt or image forming apparatuses that form a monochromatic image.

In addition, the optical head of the invention is not applied to only image forming apparatuses. For example, the optical head of the invention may be employed as illuminators used for various kinds of electronic apparatuses including, for example, a facsimile machine, a copy machine, a multifunction copier, a printer, etc. Optical heads having a plurality of light emitting devices arranged in the form of a plane may be adaptively employed for these electronic apparatuses.

The entire disclosure of Japanese Patent Application No: 2006-306253, filed Nov. 13, 2006 is expressly incorporated by reference herein.

What is claimed is:

1. A control method for controlling an optical head having a plurality of light emitting devices, comprising:
dividing the plurality of light emitting devices into a plurality of blocks by grouping adjacent light emitting devices of the plurality of light emitting devices;
adjusting levels of driving signals supplied to the adjacent light emitting devices for each of the plurality of blocks so that emission luminances of the adjacent light emitting devices belonging to the each of the plurality of blocks become substantially equal to each other; and adjusting emission periods so that the equalized emission luminances of the plurality of blocks become substantially equal to each other, wherein a number of the plurality of light emitting devices belonging to each of the plurality of blocks in a center of the optical head is larger than a number of the plurality of light emitting devices belonging to each of the plurality of blocks at an end of the optical head, and the plurality of light emitting devices are individually controlled.

2. The control method according to claim 1, wherein a range of change of emission luminance by adjusting the emission periods is larger than a range of change of emission luminance by adjusting the level of driving signals.

3. The control method according to claim 1, wherein the plurality of light emitting devices are arranged in one direction, and wherein the number of the adjacent light emitting devices belonging to each of the plurality of blocks is set depending on a relative position relationship of blocks in the optical head.

4. An optical head having a plurality of light emitting devices, comprising:

a first adjusting unit that divides the plurality of light emitting devices into a plurality of blocks by grouping adjacent light emitting devices of the plurality of light emitting devices, and adjusts levels of driving signals supplied to the adjacent light emitting devices for each of the plurality of blocks so that emission luminances of the adjacent light emitting devices belonging to each of the plurality of blocks become substantially equal to each other; and a second adjusting unit that adjusts emission periods so that the equalized emission luminances of the plurality of blocks become substantially equal to each other, wherein a number of the plurality of light emitting devices belonging to each of the plurality of blocks in a center of the optical head is larger than a number of the plurality of light emitting devices belonging to each of the plurality of blocks at an end of the optical head, and the plurality of light emitting devices are individually controlled.

5. The optical head according to claim 4, wherein the first adjusting unit includes a plurality of unit circuits provided on a one-to-one basis for the adjacent light emitting devices belonging to the each of the plurality of blocks, and the plurality of unit circuits generate driving signals having levels defined such that luminances of the adjacent light emitting devices belonging to the each of the plurality of blocks become substantially equal to a target luminance in a time period during which driving control signals are effective, wherein the second adjusting unit includes a plurality of logic circuits that supply the driving control signal to the plurality of unit circuits belonging to each of the plurality of blocks, wherein each of the plurality of logic circuits calculates a logical product of a lighting control signal to specify turning-on or turning-off of each of the adjacent light emitting devices belonging to the each of the plurality of blocks and an emission period control signal to specify the emission period set for the corresponding block and generates the driving control signal based on the calculated logical product, and wherein the emission period control signal specifies the emission period for each block of the plurality of blocks so that inter-block emission luminances become equal to each other by correcting the target luminance set for the each block of the plurality of blocks.

6. The optical head according to claim 5, wherein a data signal obtained by time-division multiplexing the lighting control signal for each block of the plurality of blocks is supplied, wherein the emission period control signal is commonly supplied to the plurality of logic circuits belonging to the corresponding block, and wherein the second adjusting unit includes a plurality of latch circuits that are provided corresponding to the plurality of logic circuits belonging to the corresponding block and each generates the lighting control signal by latching the data signal.

7. The optical head according to claim 5, wherein a data signal including a plurality of the lighting control signals and obtained by time-division multiplexing the lighting control signal for each block of the plurality of blocks is supplied, wherein the second adjusting unit includes a plurality of latch circuits that are provided corresponding to the plurality of logic circuits belonging to the corresponding block and generate the plurality of the lighting control signals by latching the data signal based on a plurality of selection signals for selecting the plurality of the lighting control signals included in the data signal, wherein the emission period control signal corresponding to one of the plurality of blocks is constituted by individual emission period control signals corresponding to the plurality of unit circuits belonging to the one of the plurality of blocks, and wherein the plurality of individual emission period control signals corresponding to one of the plurality of blocks have a substantially same length of specified emission period and have different startings of the emission period depending on corresponding selection signals.

8. An image forming apparatus comprising:

an optical head according to claim 4; and an image carrier on which an image is formed by light emitted from the optical head.

* * * * *